| (12) | United States Patent | (10) Patent No.: | US 8,903,269 B2 |
|---|---|---|---|
| | Morgan | (45) Date of Patent: | Dec. 2, 2014 |

(54) TONER DRUM GEAR PROJECTION

(71) Applicant: Clover Technologies Group, LLC, Ottawa, IL (US)

(72) Inventor: John Morgan, Newbury Park, CA (US)

(73) Assignee: Clover Technologies Group, LLC, Ottawa, IL (US)

( * ) Notice: Subject to any disclaimer, the term of this patent is extended or adjusted under 35 U.S.C. 154(b) by 0 days.

(21) Appl. No.: 14/021,775

(22) Filed: Sep. 9, 2013

(65) Prior Publication Data

US 2014/0069220 A1    Mar. 13, 2014

Related U.S. Application Data

(60) Provisional application No. 61/699,560, filed on Sep. 11, 2012.

(51) Int. Cl.
| *G03B 15/00* | (2006.01) |
| *F16H 55/17* | (2006.01) |
| *F16D 1/06* | (2006.01) |
| *G03G 15/00* | (2006.01) |

(52) U.S. Cl.
CPC ............... *F16D 1/06* (2013.01); *G03G 15/757* (2013.01); *F16H 55/17* (2013.01)
USPC ........................................................ 399/110

(58) Field of Classification Search
USPC .......................................... 399/110; D18/43
See application file for complete search history.

(56) References Cited

U.S. PATENT DOCUMENTS

| 5,247,325 | A | * | 9/1993 | Takahashi ..................... 396/516 |
|---|---|---|---|---|
| 5,903,803 | A | | 5/1999 | Kawai et al. |
| 5,926,673 | A | | 7/1999 | Foster et al. |
| 5,987,287 | A | | 11/1999 | Huang |
| 6,128,454 | A | | 10/2000 | Kawai et al. |
| 6,226,478 | B1 | | 5/2001 | Watanabe et al. |
| 6,240,266 | B1 | | 5/2001 | Watanabe et al. |
| 6,336,018 | B1 | | 1/2002 | Kawai et al. |
| 6,349,188 | B1 | | 2/2002 | Kawai et al. |
| 6,501,926 | B1 | | 12/2002 | Watanabe et al. |
| 6,501,927 | B1 | | 12/2002 | Watanabe et al. |
| 6,885,838 | B2 | | 4/2005 | Kawai et al. |
| 6,999,696 | B2 | | 2/2006 | Noda et al. |
| 7,092,655 | B2 | | 8/2006 | Noda et al. |
| 7,231,161 | B2 | | 6/2007 | Noda et al. |
| 7,236,722 | B2 | | 6/2007 | Portig |
| 7,248,814 | B2 | | 7/2007 | Kawai et al. |
| 7,274,896 | B2 | | 9/2007 | Kawai et al. |
| 7,403,733 | B2 | | 7/2008 | Watanabe et al. |
| 7,489,885 | B2 | | 2/2009 | Noda et al. |
| 7,630,661 | B2 | | 12/2009 | Noda et al. |
| 7,660,545 | B2 | | 2/2010 | Noda et al. |
| 7,813,676 | B2 | | 10/2010 | Huck et al. |
| 7,920,806 | B2 | | 4/2011 | Noda et al. |
| 8,073,364 | B2 | | 12/2011 | Huck et al. |
| D678,398 | S | * | 3/2013 | Huck et al. ..................... D18/43 |

(Continued)

*Primary Examiner* — Rodney Fuller
(74) *Attorney, Agent, or Firm* — Matthew G. Gavronski

(57) ABSTRACT

A drivable projection for a toner cartridge drum gear includes an axially extending support portion having a plurality of axially extending edges and an end face. A plurality of substantially spherical engagement portions are supported by the support portion, and each engagement portion defines a center that may be substantially aligned with the end face and/or substantially aligned with a respective one of the plurality of axially extending edges. The engagement portions are configured to receive driving rotatable force from the drive mechanism of a printer.

21 Claims, 2 Drawing Sheets

(56) References Cited

U.S. PATENT DOCUMENTS

| | | | |
|---|---|---|---|
| 8,634,747 B2 * | 1/2014 | Huck et al. | 399/167 |
| D698,861 S * | 2/2014 | Huang et al. | D18/43 |
| 2011/0211863 A1 | 9/2011 | Watanabe et al. | |
| 2012/0045247 A1 * | 2/2012 | Lewis | 399/167 |

* cited by examiner

TONER DRUM GEAR PROJECTION

CROSS-REFERENCE TO RELATED APPLICATIONS

This application claims the benefit of and priority to U.S. Provisional Patent Application No. 61/699,560, filed Sep. 11, 2012, the entire contents of which are hereby incorporated by reference.

BACKGROUND

When a toner cartridge for a laser printer is installed in a printer, a variety of mechanical and electrical connections can be made between the toner cartridge and the printer. Among the connections is a driving mechanical connection between a drive gear on the printer and a driven gear provided on one end of a toner drum in the toner cartridge. Different makes and models of printers can include mechanical and electrical connections in different configurations. For example, one line of printers utilizes a toner drum gear having a twisted, substantially triangular hole formed therein. For proper operation of aftermarket or replacement toner cartridges in that line of printers, the toner drum of the replacement toner cartridge should include a projection that is able to receive driving rotatable force from the twisted triangular hole provided in the toner drum drive gear of the printer.

SUMMARY

In some aspects, a drivable projection for a toner cartridge drum drive gear is provided and may include an axially extending support portion having an end face, and a plurality of substantially spherical engagement portions supported by the support portion. Each engagement portion may define a center that may be substantially aligned with the end face. The support portion may be substantially prism-shaped in cross-section. The support portion may include a plurality of axially extending edges, and each engagement portion may be positioned at a distal end of a respective one of the axially extending edges. The center of each engagement portion may be substantially aligned with the respective one of the axially extending edges. The support portion may include six axially extending edges and three engagement portions, and one engagement portion may be positioned at the distal end of every other parallel edge. The plurality of axially extending edges may include a set of acute angle edges and a set of obtuse angle edges, and the engagement portions may be positioned at the distal ends of the acute angle edges.

In other aspects, a drivable projection for a toner cartridge drum drive gear is provided and may include an axially extending support portion including a plurality of axially extending edges, a plurality of substantially spherical engagement portions supported by the support portion. Each engagement portion may define a center that may be substantially aligned with a respective one of the plurality of axially extending edges. Each engagement portion may be located at a distal end of the respective one of the plurality of axially extending edges. The support portion may be substantially prism-shaped in cross-section. The support portion may include an end face, and the center of each engagement portion may be substantially aligned with the end face. The support portion may include six axially extending edges and three engagement portions, and one engagement portion may be positioned along every other edge. The plurality of axially extending edges may include a set of acute angle edges and a set of obtuse angle edges, and each engagement portion may be substantially aligned with a respective one of the acute angle edges.

In still other aspects, a drive gear for a toner cartridge drum is provided and may include a coupling portion engageable with a toner drum, a gear portion having gear teeth formed thereon, an axially extending support portion, which may include a plurality of axially extending edges and an end face, and a plurality of substantially spherical engagement portions, which may be supported by the support portion. Each engagement portion may define a center substantially aligned with the end face and further substantially aligned with a respective one of the plurality of axially extending edges. The support portion may be substantially prism-shaped in cross-section. The support portion may include six axially extending edges and three engagement portions, and one engagement portion may be positioned along every other edge. The plurality of axially extending edges may include a set of acute angle edges and a set of obtuse angle edges, and each engagement portion may be substantially aligned with a respective one of the acute angle edges.

Figure 1:
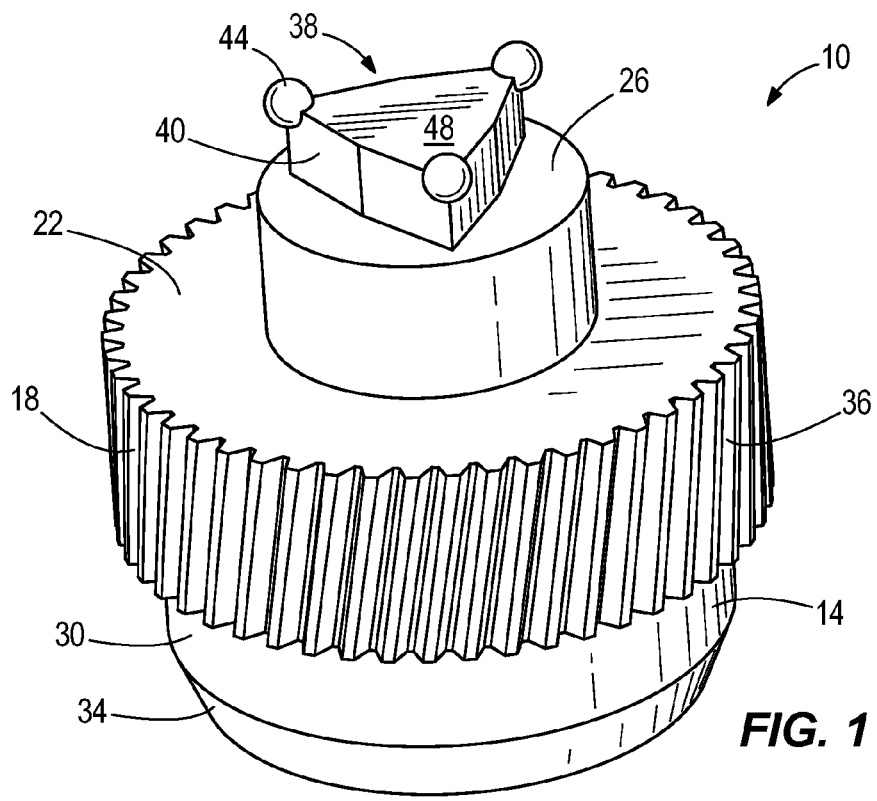
FIG. 1 is a first perspective view of a toner drum gear.
Figure 2:
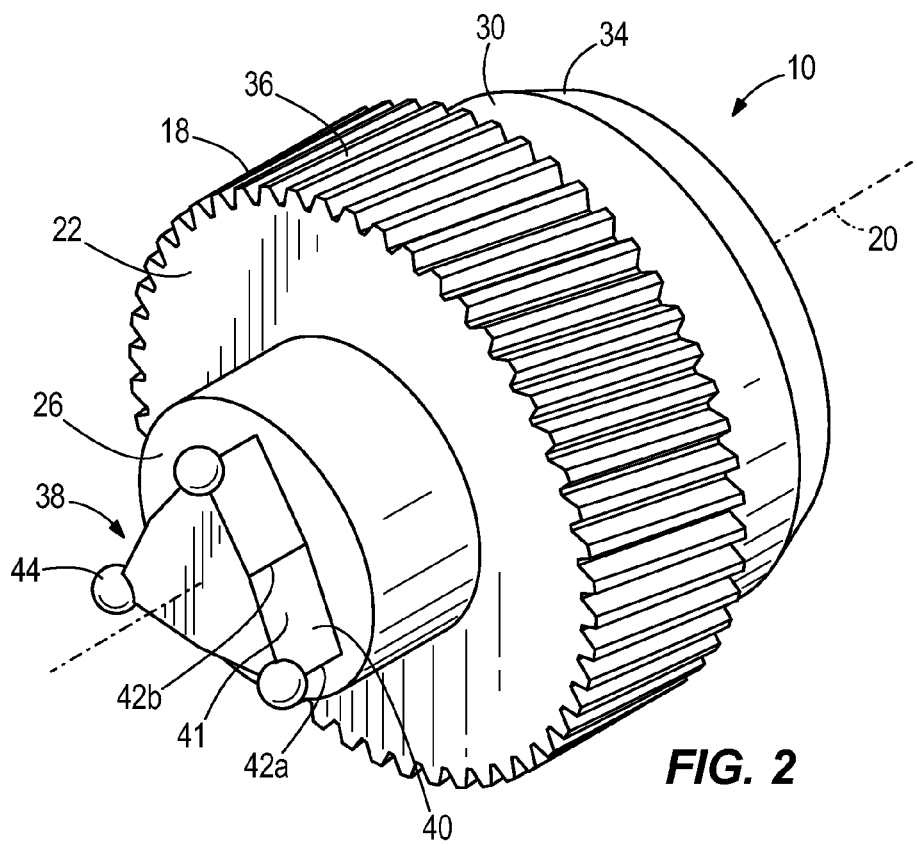
FIG. 2 is another perspective view of the toner drum gear of FIG. 1.
Figure 3:
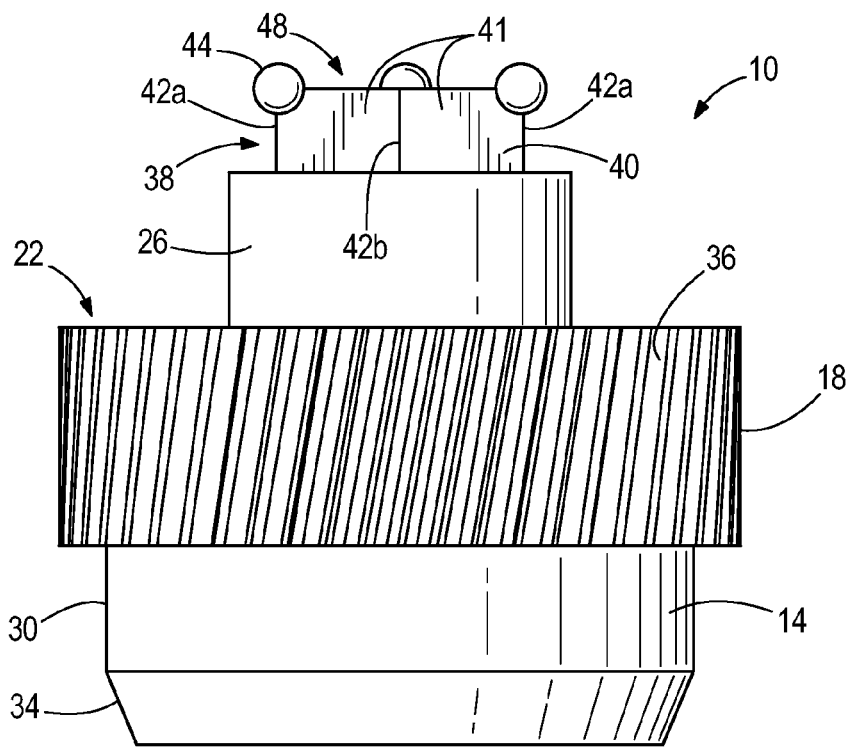
FIG. 3 is a side view of the toner drum gear of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate a toner drum gear 10 for attachment to or forming with a toner drum (not shown), such as an organophotoconductor ("OPC") drum, in a toner cartridge for a laser printer. The drum gear 10 is configured to receive driving rotatable force from a twisted triangular hole provided in the drive gear of a printer, such as that disclosed in U.S. Pat. No. 6,035,159. As such, the drum gear 10 is configured for substantial alignment with the longitudinal axis of the toner drum to which it is attached.

The drum gear 10 includes a coupling portion 14 engageable with a toner drum in a toner cartridge. In the illustrated embodiment, the coupling portion 14 is configured to fit within a cylindrical end opening defined by the toner drum (not shown), although other configurations of the coupling portion 14 are also possible for coupling with differently configured toner drums. The illustrated coupling portion 14 includes a straight portion 30 and a beveled portion 34 that assists with inserting the coupling portion 14 into the end opening of the toner drum. In other embodiments the coupling portion 14 may be hollow and receive the toner drum, may be integrally formed with the toner drum, or may otherwise be attached to the toner drum for rotation therewith.

A gear portion 18 having helical gear teeth 36 formed thereon extends from the coupling portion 14 and is engageable with other gears (not shown) in the toner cartridge. The gear portion 18 is substantially cylindrical and defines a central axis 20. In the illustrated embodiment, the gear portion 18 has an outer diameter that is greater than the outer diameter of the coupling portion 14, and includes an end face 22 that faces away from the coupling portion 14. Those skilled in the art will appreciate that, depending on the specific toner cartridge into which the drum gear 10 is being installed, gear teeth other than the illustrated gear teeth 36, or no gear teeth at all, can also be used without departing from the spirit and scope of the present invention. A generally cylindrical supporting base 26 extends axially from the end face 22 of the gear portion 18. In the illustrated embodiment the support base 26 has an outer diameter that is less than the outer diameters of the gear portion 18 and the coupling portion 14. The coupling portion 14, gear portion 18, and supporting base 26 are substantially axially aligned with respect to the central axis 20.

A drivable drive projection 38 extends axially from the supporting base 26 and is configured to fit within a hole in a drive gear, such as a twisted triangular hole provided in the drive gear of the printer into which the associated toner cartridge is to be installed. The drive projection 38 includes an axially extending support portion 40 and a plurality of generally spherically-shaped engagement portions 44 supported by the support portion 40. In the illustrated embodiment, the support portion 40 is an upright polygonal prism that extends axially from the supporting base 26 opposite the gear portion 18. More specifically, the illustrated support portion 40 is a generally hexagonal prism having six side surfaces 41 and six parallel edges 42a, 42b. Pairs of side surfaces 41 on opposite sides of the edges 42a define acute angles with respect to one another, whereas pairs of side surfaces 41 on opposite sides of the edges 42b define obtuse angles with respect to one another. In this regard, the edges 42a may be referred to as acute angle edges and the edges 42b may be referred to as obtuse angle edges. In other embodiments, the support portion 40 may have a non-prismatic shape that may include various curved or rounded edges and surfaces, or combinations of curved or rounded edges and surfaces with straight and flat edges and surfaces.

Figure 4:
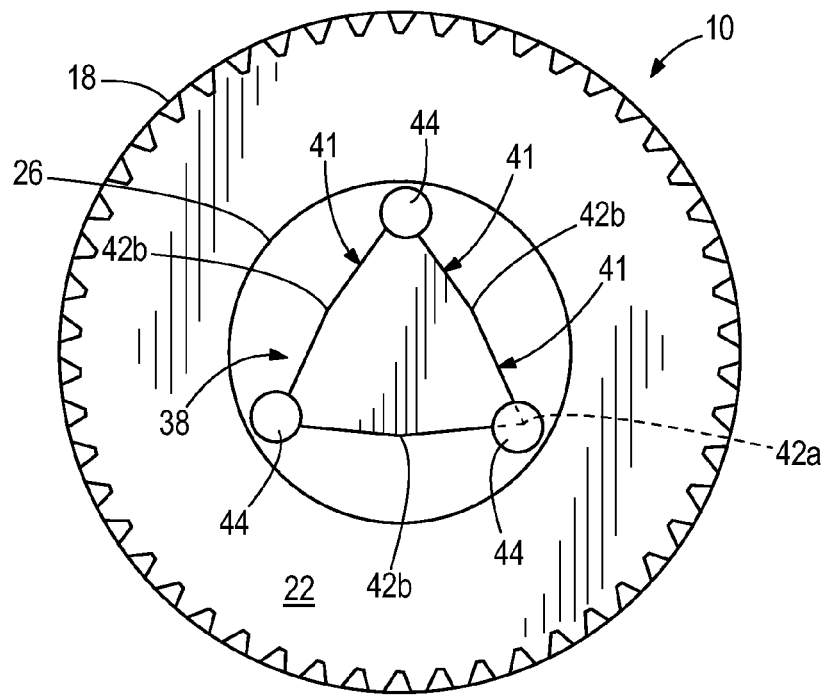
FIG. 4 is a top view of the toner drum gear of FIG. 1.

The engagement portions 44 are positioned on the distal ends of the acute angle edges edges 42a such that the centers of the substantially spherical engagement portions 44 are substantially aligned or co-planar with an end face 48 of the support portion 40. As shown in FIG. 4, the engagement portions 44 are sized and spaced to fit substantially within the outer circumference of the supporting base 26 when the drum gear 10 is viewed along the axis 20. The illustrated engagement portions 44 are also positioned such that the center of each substantially spherical engagement portion 44 is substantially aligned with a respective one of the acute angle edges 42a. In other embodiments, the engagement portions 44 may be offset from the edges 42a and located along the side surfaces 41, or aligned with the obtuse angle edges 42b. In still other embodiments in which the support portion includes rounded or curved edges or surfaces, the engagement portions 44 may be spaced along such curved edges or surfaces. Substantial alignment of the centers of the substantially spherical engagement portions 44 with the end face 48 and/or the respective edges 42a may improve manufacturability of the drum gear 10 by reducing the number and complexity of molding dies required to form the drum gear 10.

In use, the drive projection 38 is able to receive driving rotatable force from the drive gear of the printer. More specifically, the engagement portions 44 of the drive projection 38 are sized and spaced to fit within the hole of the drive gear, such as a twisted triangular hole provided in the drive gear, such that when the drive mechanism begins to rotate, the engagement portions 44 engage the inner surfaces of the twisted triangular hole and rotate with the drive mechanism.

While specific embodiments have been illustrated and described, numerous modifications come to mind without significantly departing from the spirit of the disclosure, and the scope of protection is to be commensurate with the scope of the accompanying claims.

What is claimed is:

1. A drivable projection for a toner cartridge drum drive gear, the projection comprising:
   an axially extending support portion having an end face and six axially extending edges; and
   three substantially spherical engagement portions supported by the support portion, each engagement portion defining a center that is substantially aligned with the end face, and the engagement portions arranged such that one engagement portion is positioned at a distal end of every other axially extending edge.

2. The drivable projection of claim 1, wherein the support portion is substantially prism-shaped in cross-section.

3. The drivable projection of claim 1, wherein the center of each engagement portion is substantially aligned with its respective axially extending edge.

4. The drivable projection of claim 1, wherein the six axially extending edges includes a set of acute angle edges and a set of obtuse angle edges, and wherein the engagement portions are positioned at the distal ends of the acute angle edges.

5. A drivable projection for a toner cartridge drum drive gear, the projection comprising:
   an axially extending support portion including six axially extending edges; and
   three substantially spherical engagement portions supported by the support portion, each engagement portion defining a center substantially aligned with a respective one of the plurality of axially extending edges,
   wherein one engagement portion is positioned along every other edge.

6. The drivable projection of claim 5, wherein each engagement portion is located at a distal end of its respective axially extending edge.

7. The drivable projection of claim 5, wherein the support portion is substantially prism-shaped in cross-section.

8. The drivable projection of claim 5, wherein the support portion includes an end face, and wherein the center of each engagement portion is substantially aligned with the end face.

9. The drivable projection of claim 5, wherein the six axially extending edges includes a set of acute angle edges and a set of obtuse angle edges, and wherein each engagement portion is substantially aligned with a respective one of the acute angle edges.

10. A drive gear for a toner cartridge drum, the gear comprising:
    a coupling portion engageable with a toner drum;
    a gear portion having gear teeth formed thereon;
    an axially extending support portion including a plurality of axially extending edges and an end face; and
    a plurality of substantially spherical engagement portions supported by the support portion, each engagement portion defining a center substantially aligned with the end face and with a respective one of the plurality of axially extending edges,
    wherein the support portion includes six axially extending edges and three engagement portions, and wherein one engagement portion is positioned along every other edge.

11. The drive gear of claim 10, wherein the support portion is substantially prism-shaped in cross-section.

12. The drive gear of claim 10, wherein the plurality of axially extending edges includes a set of acute angle edges and a set of obtuse angle edges, and wherein each engagement portion is substantially aligned with a respective one of the acute angle edges.

13. A drivable projection for a toner cartridge drum drive gear, the projection comprising:
   an axially extending support portion having an end face and a plurality of axially extending edges; and
   a plurality of substantially spherical engagement portions supported by the support portion, each engagement portion defining a center that is substantially aligned with the end face, and each engagement portion positioned at a distal end of a respective one of the axially extending edges,
   wherein the plurality of axially extending edges includes a set of acute angle edges and a set of obtuse angle edges, and wherein the engagement portions are positioned at the distal ends of the acute angle edges.

14. The drivable projection of claim 13, wherein the support portion is substantially prism-shaped in cross-section.

15. The drivable projection of claim 13, wherein the center of each engagement portion is substantially aligned with the respective one of the axially extending edges.

16. A drivable projection for a toner cartridge drum drive gear, the projection comprising:
   an axially extending support portion including a plurality of axially extending edges; and
   a plurality of substantially spherical engagement portions supported by the support portion, each engagement portion defining a center substantially aligned with a respective one of the plurality of axially extending edges,
   wherein the plurality of axially extending edges includes a set of acute angle edges and a set of obtuse angle edges, and wherein each engagement portion is substantially aligned with a respective one of the acute angle edges.

17. The drivable projection of claim 16, wherein each engagement portion is located at a distal end of the respective one of the plurality of axially extending edges.

18. The drivable projection of claim 16, wherein the support portion is substantially prism-shaped in cross-section.

19. The drivable projection of claim 16, wherein the support portion includes an end face, and wherein the center of each engagement portion is substantially aligned with the end face.

20. A drive gear for a toner cartridge drum, the gear comprising:
   a coupling portion engageable with a toner drum;
   a gear portion having gear teeth formed thereon;
   an axially extending support portion including a plurality of axially extending edges and an end face; and
   a plurality of substantially spherical engagement portions supported by the support portion, each engagement portion defining a center substantially aligned with the end face and with a respective one of the plurality of axially extending edges,
   wherein the plurality of axially extending edges includes a set of acute angle edges and a set of obtuse angle edges, and wherein each engagement portion is substantially aligned with a respective one of the acute angle edges.

21. The drive gear of claim 20, wherein the support portion is substantially prism-shaped in cross-section.

* * * * *